United States Patent
Guichard et al.

(10) Patent No.: US 9,438,512 B2
(45) Date of Patent: *Sep. 6, 2016

(54) STACKING METADATA CONTEXTS FOR SERVICE CHAINS

(71) Applicant: Cisco Technology, Inc., San Jose, CA (US)

(72) Inventors: James Guichard, New Boston, NH (US); Paul Quinn, San Francisco, CA (US); David Ward, Los Gatos, CA (US); Surendra Kumar, San Ramon, CA (US); Nagaraj A. Bagepalli, Fremont, CA (US); Michael R. Smith, San Jose, CA (US); Navindra Yadav, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/851,236

(22) Filed: Sep. 11, 2015

(65) Prior Publication Data

US 2016/0006651 A1 Jan. 7, 2016

Related U.S. Application Data

(63) Continuation of application No. 13/910,179, filed on Jun. 5, 2013, now Pat. No. 9,178,812.

(51) Int. Cl.
*H04L 12/721* (2013.01)
*H04L 12/725* (2013.01)
*H04L 29/06* (2006.01)

(52) U.S. Cl.
CPC ........... *H04L 45/566* (2013.01); *H04L 45/306* (2013.01); *H04L 69/22* (2013.01)

(58) Field of Classification Search
CPC ....................................................... H04L 45/566
USPC ............................................................ 370/392
See application file for complete search history.

(56) References Cited

U.S. PATENT DOCUMENTS 6,687,226 B1 2/2004 Galyas
6,985,488 B2 1/2006 Pan et al.
(Continued)

OTHER PUBLICATIONS

Fernando et al., "Virtual Topologies for Service Chaining in BGP IP VPNs; draft-rfernando-l3vpn-service-chaining-01", Internet Engineering Task Force, Feb. 25, 2013, 16 Pages.
(Continued)

*Primary Examiner* — Melvin Marcelo
*Assistant Examiner* — Peter Solinsky
(74) *Attorney, Agent, or Firm* — Edell, Shapiro & Finnan, LLC

(57) ABSTRACT

Presented herein are techniques useful in a network comprising a plurality of network nodes each configured to apply one or more service functions to traffic that passes through the respective network nodes. A network node receives packets encapsulated in a service header that includes information defining a first set of context headers stacked into an association of metadata that is relevant to one or more service functions within a service path comprised of one or more network nodes. The network node performs at least one of the service functions in the service path and rewrites the service header with a second set of context headers. The second set of context headers include metadata derived from performing the service function(s) at the network node.

20 Claims, 7 Drawing Sheets

(56) References Cited

U.S. PATENT DOCUMENTS

| | | |
|---|---|---|
| 7,197,008 B1 | 3/2007 | Shabtay et al. |
| 7,298,693 B1 | 11/2007 | Owens et al. |
| 7,457,248 B1 | 11/2008 | Ali et al. |
| 7,480,283 B1 | 1/2009 | Sylvain |
| 7,558,261 B2 | 7/2009 | Arregoces et al. |
| 7,571,470 B2 | 8/2009 | Arregoces et al. |
| 7,610,375 B2 | 10/2009 | Portolani et al. |
| 7,643,468 B1 | 1/2010 | Arregoces et al. |
| 7,657,940 B2 | 2/2010 | Portolani et al. |
| 7,804,767 B1 | 9/2010 | Owens et al. |
| 7,895,425 B2 | 2/2011 | Khalid et al. |
| 7,983,174 B1 | 7/2011 | Monaghan et al. |
| 8,150,963 B2 | 4/2012 | Baek et al. |
| 8,311,045 B2 | 11/2012 | Quinn et al. |
| 8,369,330 B2 | 2/2013 | Allan et al. |
| 8,442,043 B2 | 5/2013 | Sharma et al. |
| 8,532,087 B2 | 9/2013 | Kojima et al. |
| 2006/0092950 A1 | 5/2006 | Arregoces et al. |
| 2006/0095960 A1 | 5/2006 | Arregoces et al. |
| 2006/0203720 A1 | 9/2006 | Kano |
| 2007/0237147 A1 | 10/2007 | Quinn et al. |
| 2007/0286204 A1 | 12/2007 | Ould-Brahim |
| 2008/0049621 A1 | 2/2008 | McGuire et al. |
| 2008/0120394 A1 | 5/2008 | Yokoyama et al. |
| 2008/0177896 A1 | 7/2008 | Quinn et al. |
| 2008/0225857 A1 | 9/2008 | Lange |
| 2009/0037713 A1 | 2/2009 | Khalid et al. |
| 2009/0304010 A1 | 12/2009 | Kurebayashi et al. |
| 2009/0323522 A1 | 12/2009 | Deguchi |
| 2010/0058329 A1 | 3/2010 | Durazzo et al. |
| 2010/0077063 A1 | 3/2010 | Amit et al. |
| 2010/0165985 A1 | 7/2010 | Sharma et al. |
| 2011/0023090 A1 | 1/2011 | Asati et al. |
| 2011/0045818 A1 | 2/2011 | Banks et al. |
| 2011/0054644 A1 | 3/2011 | Baek et al. |
| 2011/0305136 A1 | 12/2011 | Pan et al. |
| 2012/0082048 A1 | 4/2012 | Taft et al. |
| 2013/0163594 A1 | 6/2013 | Sharma et al. |
| 2013/0272305 A1 | 10/2013 | Lefebvre et al. |
| 2013/0329546 A1 | 12/2013 | Wijnands |
| 2014/0029414 A1 | 1/2014 | Jain et al. |
| 2014/0050223 A1 | 2/2014 | Foo et al. |
| 2014/0064062 A1 | 3/2014 | Taillon et al. |
| 2014/0215560 A1 | 7/2014 | Roberson |
| 2014/0307744 A1 | 10/2014 | Dunbar et al. |
| 2014/0334488 A1 | 11/2014 | Guichard et al. |
| 2014/0362857 A1 | 12/2014 | Guichard et al. |

OTHER PUBLICATIONS

Fang et al., "BGP IP VPN Virtual PE; draft-fang-l3vpn-virtual-pe-02", Internet Engineering Task Force, Apr. 7, 2013, 26 pages.

International Search Report and Written Opinion in International Application No. PCT/US2014/036907, mailed Nov. 10, 2014, 11 pages.

International Search Report and Written Opinion in International Application No. PCT/US2014/036789, mailed Aug. 21, 2014, 14 pages.

International Search Report and Written Opinion in International Application No. PCT/US2014/059011, mailed Jan. 29, 2015, 10 pages.

Quinn et al., "Network Service Header—draft-guinn-sfc-nsh-03.txt", Internet Engineering Task Force, Standard Working Draft, Internet Society, Jul. 3, 2014, 27 pages.

Joseph, et al., "A Policy-aware Switching Layer for Data Centers," SIGCOMM'08, Aug. 17-22, 2008, Seattle, Washington, USA, pp. 51-62.

Paul, et al., "OpenADN: Mobile Apps on Global Clouds Using OpenFlow and Software Defined Networking," GC'12 Workshop: First International workshop on Management and Security technologies for Cloud Computing 2012, Dec. 2012, 5 pages.

Gurbani, et al., "Session Initiation Protocol (SIP) Overload Control," Internet Engineering Task Force (IETFf), SOC Working Group, Internet-Draft, Intended status: Standards Track, May 23, 2013, 35 pages.

Rosenberg, et al., "SIP: Session Initiation Protocol," Internet Engineering Task Force (IETF), Network Working Group, Standards Track, Request for Comments: 3261, Jun. 2002, 269 pages.

Hilt, et al., "Design Considerations for Session Initiation Protocol (SIP) Overload Control," Internet Engineering Task Force (IETF), Informational, Request for Comments: 6357, Aug. 2011, 25 pages.

Cisco, "Cisco Nexus 1000V Series Switches: Deploy Cisco vPath Service-Chaining Architecture," White Paper, retrieved from http://www.cisco.com/c/en/us/products/collateral/switches/nexus-1000v-switch-vmware-vsphere/white_paper_c11-713736.htrnl, on Sep. 16, 2014, pp. 1-4.

Rosen, et al., "BGP/MPLS IP Virtual Private Networks (VPNs)," Network Working Group, RFC 4364, Feb. 2006, pp. 1-47.

STACKING METADATA CONTEXTS FOR SERVICE CHAINS

CROSS-REFERENCE TO RELATED APPLICATION

This application claims priority to U.S. application Ser. No. 13/910,179, filed Jun. 5, 2013, the entirety of which is incorporated herein by reference.

TECHNICAL FIELD

The present disclosure relates to networking for service chains/service paths.

BACKGROUND

Network services are widely deployed and essential in many networks. The services provide a range of functions such as security, wide area network (WAN) acceleration, firewall services, and server load balancing. Service functions that form part of the overall service may be physically located at different points in the network infrastructure, such as the wide area network, data center, campus, and so forth.

Current network service deployment models are relatively static, and bound to topology for insertion and policy selection. Furthermore, they do not adapt well to elastic service environments enabled by virtualization.

New data center network and cloud architectures require more flexible network service deployment models. Additionally, the transition to virtual platforms requires an agile service insertion model that supports elastic service delivery. The movement of service functions and application workloads in the network and the ability to easily bind service policy to granular information such as per-subscriber state are particularly useful.

DESCRIPTION OF EXAMPLE EMBODIMENTS

Overview

Figure 1:
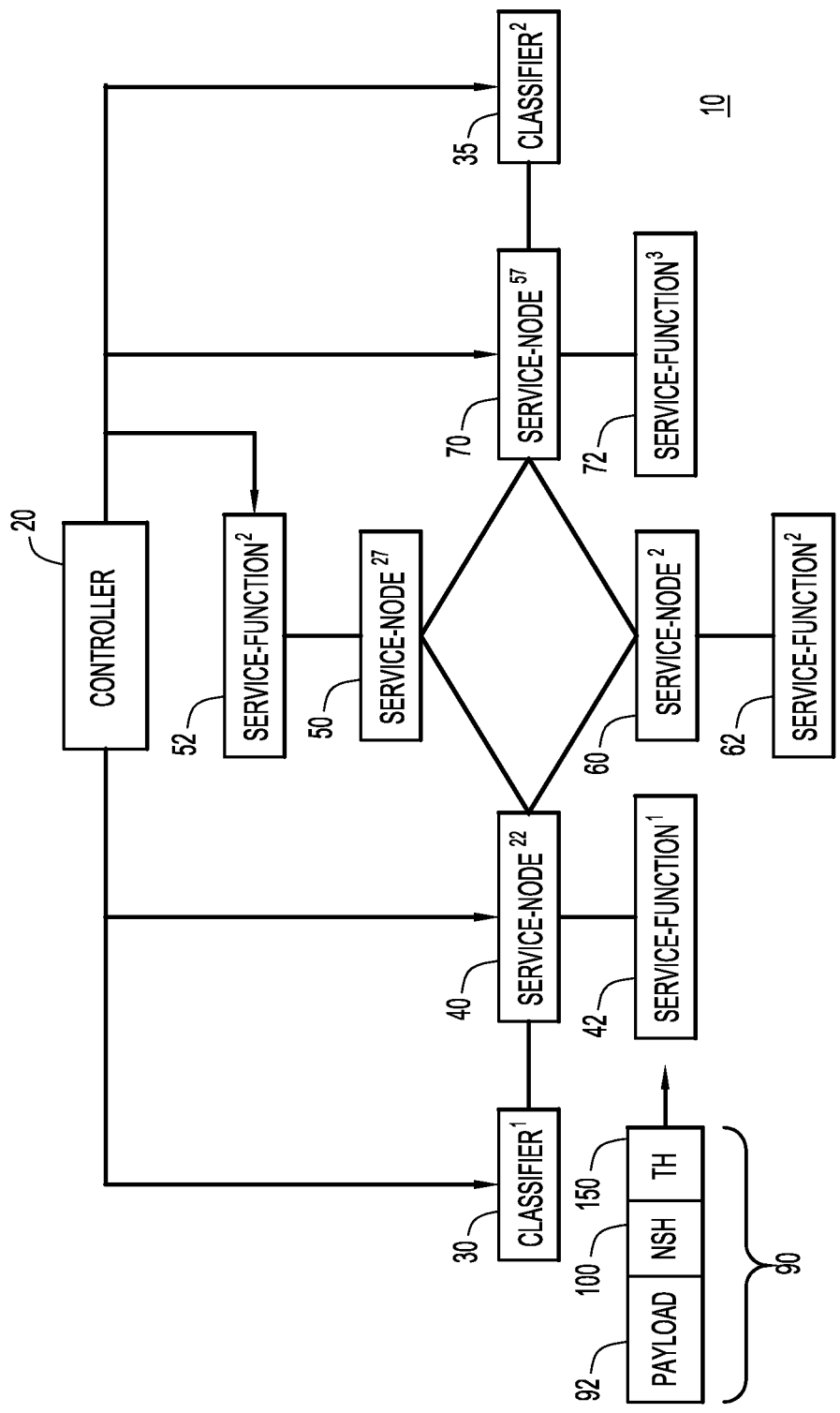
FIG. 1 is a block diagram of an example arrangement of service nodes in a network, wherein the service nodes are configured to perform process stacked metadata headers contained in a service header in which packets are encapsulated according to the techniques presented herein.

Presented herein are techniques useful in a network comprising a plurality of network nodes each configured to apply one or more service functions to traffic that passes through the respective network nodes. A network node receives packets encapsulated in a service header that includes information defining a first set of context headers stacked into an association of metadata that is relevant to one or more service functions within a service path comprised of one or more network nodes. The network node performs at least one of the service functions in the service path and rewrites the service header with a second set of context headers. The second set of context headers include metadata derived from performing the service function(s) at the network node.

Example Embodiments

A service chain is defined as a set of service functions, e.g., firewall, network address translation (NAT), deep packet inspection (DPI), intrusion detection service (IDS), and the order in which they should be applied to selective packets as they are forwarded through a service-path. This form of service chaining, while useful, does not provide enough functionality for the delivery of more complex services that rely upon the binding of service policy to granular information such as per-subscriber state, or receipt of metadata specifically formatted for consumption by a particular service function. Examples of metadata specifically formatted for consumption by a service function include application identification, flow identifier and user identity. Such advanced services require that service context and metadata be carried within service headers as part of the data-plane encapsulation.

Service nodes utilize information carried within service headers in the data-plane, such as network classification used for deriving targeted service policies and profiles. Service nodes may also determine common metadata related to a particular service such as finer classification that can be passed to the service functions further down the service-path. In other words, services benefit from metadata derived both from the network as well as the service functions that form a given service chain. Metadata can also be passed between network nodes and be used, for example, to determine forwarding state at the end of a service chain.

The metadata imposed by the network node originating the service chain is a combination of the metadata pushed by a central controller and metadata determined by the network node itself. Controllers push network classification specific metadata to all the network nodes that act as classifiers. These network nodes perform the classification and choose the assigned metadata for that classification along with the forwarding state. The determined metadata could be related to aspects of the service topology such as tenant identity. The implication of associating such metadata to the forwarding state and passing it to the functions that provide services is that more complex services can be delivered, for instance, on a tenant boundary for a given service-path. This can result in simpler services because the services do not need to derive information or re-classify every packet/flow.

According to a first aspect, presented herein are techniques the creation of service headers with a base header that identifies a particular service path and a set of four fixed-sized context headers used to carry platform and service metadata. Traffic selected for steering through a service chain is encapsulated first in a service header, the result of which is then encapsulated in a transport header. The transport header is the overlay header that carries the packets from the classifying network node to the first service function of the service chain or to a network node that acts as a terminator of the overlay on behalf of the service function.

According to a second aspect, techniques are presented for realizing a variable set of contexts carried within the service header and stacked into an association of metadata that is relevant to one or more of the service functions within the service chain. The number of context headers in the stack is variable and so is the size of each context header, and therefore an arbitrary number of contexts may be bound to one or more service chains.

Reference is now made to FIG. 1 for a description of an example network environment 10 in which the techniques presented herein may be employed. In the example of FIG. 1, there is a controller 20 that is in communication with classifier network nodes 30 and 35 and with a plurality of service nodes 40, 50, 60 and 70. The service nodes 40, 50, 60 and 70 are also called network nodes herein and the classifier nodes 30 and 35 are also called head-end nodes. The service nodes 40, 50, 60 and 70 host/support respective service-functions 42, 52, 62 and 72, each service-function having a corresponding service-id. Service node 40 is also denoted service-node$^{22}$, service node 50 is denoted service-node$^{27}$, service node 60 is denoted service-node$^{2}$, and service node 70 is denoted service-node$^{57}$. Service node 40 hosts service-function 42 that is also denoted service-function$^{1}$. Service node 50 hosts service-function 52 that is also denoted service-function$^{2}$. Service node 60 hosts service-function 62 that is also denoted service-function$^{2}$. Service node 70 hosts service-function 72 that is also denoted service-function$^{3}$. Some of the service-functions hosted by the service nodes are the same in the example of FIG. 1. Specifically, service node 50 and service node 60 host service-functions 52 and 62 which are the same service-function, service-function$^{2}$. In other words, service-function$^{2}$ appears in multiple instances on different service nodes in the example scenario of FIG. 1.

FIG. 1 also shows an example of a packet 90 that passes through the head-end node 30. The packet 90 includes payload 92 that is encapsulated in a Network Service Headers (NHS) 100 and then encapsulated within a transport header (TH) 150. The NSH 100 is metadata added to a packet or frame that is used to create a service plane. The payload 92 and the NSH 100 are then encapsulated in an outer header, the TH 150, for transport. The NSH 100 may be added by a service classification function, i.e., the head-node 30 (in the form of a device or application), that determines which packets require servicing, and correspondingly which service path to follow to apply the appropriate service.

The Network Service Header

Service chaining techniques are enabled through the use of a transport independent Network Service Headers (NSH) in the data plane. The NSH 100 comprises a plurality of headers, and as will become apparent, these headers contain service related information and have two main elements:
1. A fixed sized, transport independent per-packet/frame service metadata.
2. Data plane encapsulation that utilizes the network overlay topology to deliver packets to the requisite services.

The NSH 100 is designed to be easy to implement across a range of devices, both physical and virtual, including hardware forwarding elements. The NSH 100 addresses several limitations associated with network service deployment today.

Topological Dependencies: network service deployments are often coupled to the physical network topology creating artificial constraints on delivery. These topologies serve only to "insert" the service function; they are not required from a native packet delivery perspective. For example, firewalls often require an "in" and "out" layer-2 segment and adding a new firewall requires changing the topology i.e. adding new layer-2 segments. This is restrictive because as more services are required—often with strict ordering—topology changes are needed before and after each service resulting in complex network changes and device configuration. In such topologies, all traffic, whether a service needs to be applied or not, will often pass through the same strict order. A common example is web servers using a server load balancer as the default gateway. When the web service responds to non-load balanced traffic (e.g. administrative or backup operations), all traffic from the server must traverse the load balancer forcing network administrators to create complex routing schemes or create additional interfaces to provide an alternate topology.

Service Chaining: service functions are most typically independent, e.g. service-function-1 and service-function-2 are unrelated and there is no notion at the service layer that service-function-1 occurs before service-function-2. However, to an administrator many service functions have a strict ordering that must be in place yet there is no consistent way to impose and verify the deployed service ordering.

Service Policy Application: service functions rely on either topology information such as virtual local area networks (VLANs) or packet (re)classification to determine service policy selection, the service action taken. Topology information is increasingly less viable due to scaling, tenancy, and complexity reasons. Per-service function packet classification is inefficient and prone to errors, duplicating functionality across services. Furthermore, packet classification is often too coarse lacking the ability to determine class of traffic with enough detail.

Elastic Service Delivery: given the current state of the art for adding/removing services largely centers around VLANs and routing changes, rapid changes to the service layer can be difficult to realize due to the risk and complexity of such changes.

Common Header Format: various proprietary methods are used to share metadata and create service paths. An open header provides a common format for all network and service devices.

Transport Agnostic: services can and will be deployed in networks with a range of transports, including underlays and overlays. The coupling of services to topology requires services to support many transports or for a transport gateway function to be present.

Figure 2:
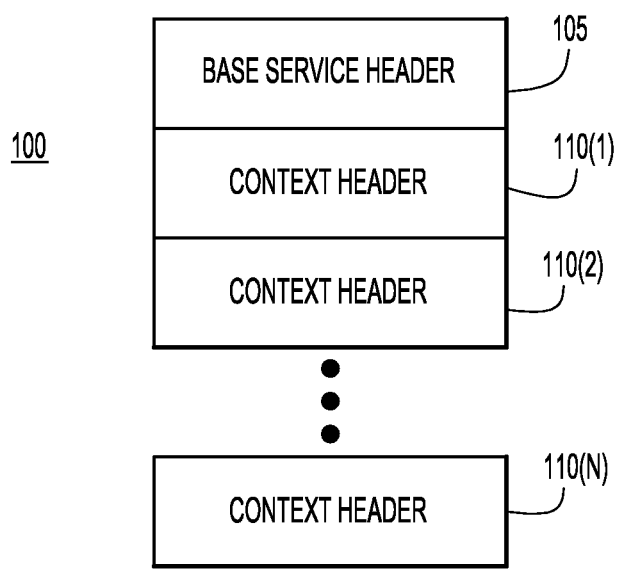
FIG. 2 is a diagram of an example of a service header containing a stacked and variable set of context headers.

Turning now to FIG. 2, the NSH 100 is described in more detail. The NSH 100 consist of a two word base header 105 and a plurality of context headers 110(1)-110(N). The base header 105 may be composed of two words, but for simplicity it is shown as a single element in FIG. 2. The base header 105 provides information about the NSH 100 and service path identification. The context headers 110(1)-110 (N) carry opaque metadata, and examples of context headers are described hereinafter.

Service header aware nodes, e.g., service classifiers, services nodes and forwarding elements in the service plane, have several possible NSH related actions.

Insert/remove service header: these actions can occur at the start and end respectively of a service path or can be performed by a service function that determines that a service path must change due to local policy. Data is classified, and if determined to require servicing, a service header imposed. A service function can re-classify data as required. A service classifier inserts an NSH. As the end of a service chain, the last node operating on the service header removes it.

Forward based on header fields: the base header provides service chain information and is used by participating nodes to determine correct service path selection and forwarding as well as loop detection. Participating nodes use the base header for selecting the next service in the service path.

Update a service header: fields in the base service header are updated by service functions. Context headers may be updated as needed, for example if more granular classification occurs. If a non-service element acts as a data plane proxy (adding and removing the NSH 100 on behalf of the service), then that node updates the base header.

Service Policy Selection: service instances derive policy selection from the service header. Context shared in the service header can provide a range of service-relevant information such as traffic classification. Service functions use the NSH 100 to select local service policy.

Once the metadata is added to a packet, an outer encapsulation is used to forward the original packet and the associated metadata to the start of a service chain. The encapsulation serves two purposes:
1. Creates a topologically independent services plane. Packets are forwarded to the required services without changing the underlying network topology.
2. Non-participating network nodes simply forward the encapsulated packets as is.

The NSH 100 is independent of the encapsulation used and may be encapsulated using any transport scheme now known or hereinafter developed. The presence of the NSH 100 is indicated via protocol type in the outer encapsulation or, in the case of Multi-Protocol Label Switching (MPLS), the presence of the Generic Associate Channel G-Ach Label (GAL).

Figure 3:
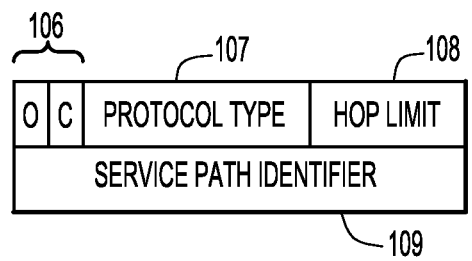
FIG. 3 is a diagram of an example of a base service header contained in the service header.
Figure 4:
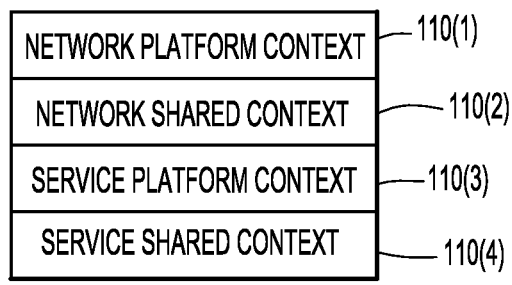
FIG. 4 is a diagram of an example set of context headers.

Turning now to FIG. 3, an example of the structure of the base header 105 is described. The base header 105 includes a field 106 that contains certain flags described below, a protocol type field 107, a hop limit field 108 and a service path identifier field 109. The field 106 includes an "O" bit and a "C" bit. The "O" bit is a one-bit flag that indicates whether a packet is an operations and management (OAM) packet. Participating nodes examine the payload and take appropriate action (i.e. return status information) when the "O" bit is set. The "C" bit indicates whether context headers are present. When the "C" bit is set, one or more contexts are in use (i.e. a value placed in a context is significant). The "C" bit specifies that the ordering and sizing of the contexts is predetermined, e.g., as shown in FIG. 4 described hereinafter. A "C" bit equal to zero indicates that no contexts are in use and that they can be ignored. If a context header is not in use, the value of that context header is zero.

The protocol type field 107 indicates the protocol type of the original packet or frame. The hop limit field 108 specifies time-to-live (TTL) functionality and location within the service path. The hop limit is decremented by service nodes after performing required service function(s).

The service path identifier field 109 identifies a particular service path. A participating node uses this identifier for path selection.

The combination of the service path identifier and hop limit carried within the NSH is used for identification of which specific service functions should be applied to packets. Each service path identifier is a unique value that points to an ordered list of service functions [service-function-1, service-function-2, service-function-3] and the hop limit is decremented by 1 at each service hop so that a Service Node receiving a packet prefaced with a NSH is able to identify which of the ordered list of service functions it should apply.

FIG. 4 illustrates an example set of context headers 110(1)-110(4). Context header 110(1) is a network platform context that provides platform-specific metadata shared between network nodes. Context header 110(2) is a network shared context that provides metadata relevant to any network node, such as the result of edge classification. Context header 110(3) is a service platform context that provides service platform specific metadata shared between service functions. Context header 110(4) is a service shared context that provides metadata relevant to, and shared, between service functions. Thus, each context header carries service related information of a different scope that is relevant to one or more service functions in the service path.

Variable Set of Context Headers

The four fixed sized context headers 110(1)-110(4) shown in FIG. 4 are used to provide platform or service specific metadata that is shared between network nodes. These context headers may be fixed in number and the optional nature of contexts is only in the form of invalid NULL values. This fixed number of context headers may not be sufficient in satisfying all types of services that require direct manipulation of metadata and the ability to "stack" arbitrary numbers of context headers that are associated and bound to the service chain.

Accordingly, a variable set of context headers is provided, that is carried within the service header and stacked into an association of metadata that is relevant to one or more of the service functions within the service chain. The number of context headers in the stack is variable and the size/length of each context header is variable, and therefore an arbitrary number of context headers may be bound to one or more service chains.

Figure 5:
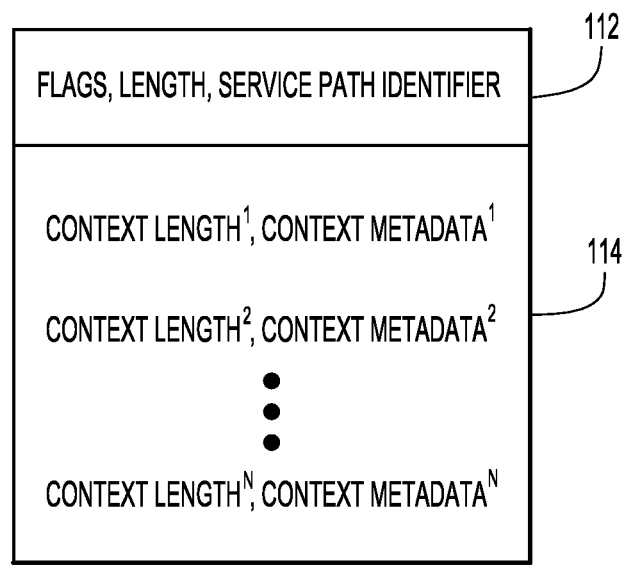
FIG. 5 is a diagram illustrating an example of a format for a variable set of variable length context headers.

Reference is now made to FIG. 5. FIG. 5 shows a configuration to stack of variable length context headers. Specifically, there is a base context field 112 that includes one or more flags, a length value and a service path identifier, and a variable sized context header field 114. The base context field 112 includes one or more flags to indicate information about the header such as layout (e.g. longer service path identifier) of a packet or information about the context headers (e.g., layout), a length value corresponding to (i.e., indicating) the number of context headers contained in the set of context headers in the context header field 114 and a service path identifier to indicate/specify the service path to which the variable set of context headers applies.

In the context header field 114, there are one or more variable sized contexts, each specified by a length and associated context metadata as shown in FIG. 5. For example, the first context header has Context Metadata$^1$ that has a length or size specified by Context Length$^1$. Similarly, the second context header has Context Metadata$^2$ that has a length or size specified by Context Length$^2$, and so on. Again, each context header carries service related information of a different scope that is relevant to one or more service functions in the service path, as described above in connection with FIG. 4.

Thus to summarize, the NSH 100 includes a base context header that specifies a service path identifier for the service path to which the variable set of context headers applies, and a length value corresponding to the number of context headers contained in the set of context headers, and a context length field for each context, the context field containing the metadata for the corresponding context header.

The context headers serve several purposes. For example, they pass metadata to the service nodes for interpretation and for deriving service policy/profiles necessary to deliver service corresponding to the service path. In other words, each context header may be interpreted to derive a service profile used for applying a service function at the network node in the service path. In addition, the context headers pass forwarding state to the intermediate network nodes as well as services that participate in realizing the service chain. The context headers may be defined and predetermined by the controller (e.g., controller 20 as shown in FIG. 1) that is in communication with the plurality of service nodes or they may be determined and agree upon, a priori, among the service nodes. In the latter case, each of the plurality of network service stores information indicating the structure and definitions on which the variable set of context headers are based.

The metadata passed in the context headers is specific to the forwarding state carried and in that sense, different forwarding paths might carry different metadata. The controller is responsible for managing and pushing service chains to the network nodes that act as classifiers. The service-chains and the forwarding path used to realize the service chains determine the service forwarding path or service-path. The service-path thus becomes the forwarding state that all network nodes have to extract from the context stack in determining the next-hop of the service chain. The network nodes can utilize this forwarding state not only to determine the next-hop for the service chain but also to perform additional transformations on the traffic in accordance with metadata for a particular context header in order to support a variety of service instances, i.e., in order to support a particular service function. As an example, the network nodes can replace the incoming transport with a completely different one that is understood by the service while preserving the context stack. The context headers also enable network nodes to act as proxies to the service functions of another network node and perform mapping of metadata to primitive interfaces understood by the services. Thus, when a network node receives a service header, parses the service header to retrieve the one or more stacked context headers, the network node interprets a forwarding state and a next-hop network node for the service path from the service header, and determines a service action or associated metadata from the set of context headers.

The configuration shown in FIG. 5 thus involve stacking of service context headers along with service metadata applicable to one or more service functions of a given service chain/service path and associating the stacked context headers with forwarding state for a given service path. The arbitrary number of variable or fixed context headers is associated and bound to the forwarding state and corresponding metadata of a service chain/service path. This enables independent forwarding actions to be made at a service node based on the combination of forwarding state and metadata, that is, based solely on the service header or variable set of context headers in the service header. For example, a service node may determine whether to bypass a service function at the service node based on the variable set of context headers contained in the service header. Moreover, the stacked context headers enable service functions at service nodes to utilize the metadata in delivering enhanced services. Service nodes can optimize the service path by utilizing the metadata feedback per forwarding state, from the service function. In other words, packets can be forwarded into a service path without steering traffic through a head-end node/classifier.

Figure 6:
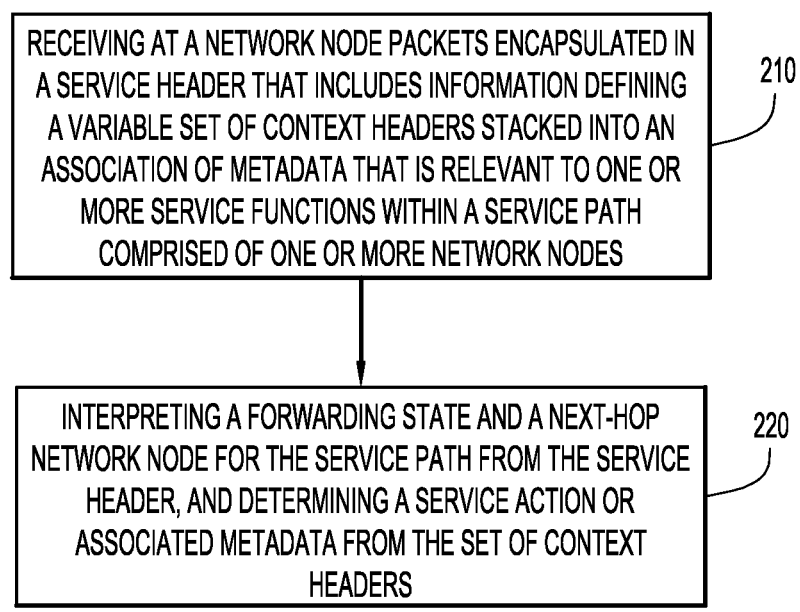
FIG. 6 is a flow chart depicting operations performed at a network node when receiving packets encapsulated in a service header that contains a variable set of context headers.

FIG. 6 illustrates a flow chart that depicts the operations of a process 200 performed in a service node (network node) when receiving packets that are encapsulated in the NSH 100 that includes stacked context headers. As depicted above in FIG. 1, these operations are performed in a network node that is part of a network that comprises a plurality of network nodes, each configured to apply one or more service functions to traffic that passes through the respective network nodes. At 210, a given network node receives packets encapsulated in a service header that includes information defining a variable set of context headers stacked into an association of metadata that is relevant to one or more service functions within a service path comprised of one or more network nodes. At 220, the network node interprets a forwarding state and a next-hop network node for the service path from the service header, and determines a service action or associated metadata from the set of context headers. Interpreting may involve determining how to forward traffic at the network node based solely on the service header or variable set of context headers in the service header. Another example of the interpreting operation that a network node may perform is determining whether to bypass a service function at the network node based on the variable set of context headers contained in the service header, as described above.

Figure 7:
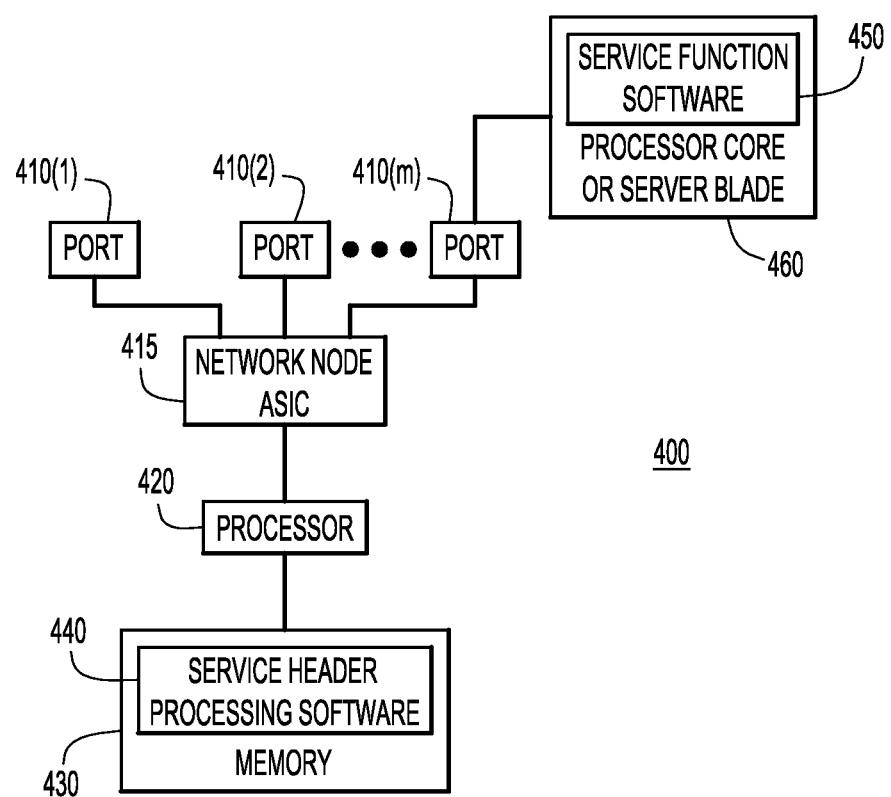
FIG. 7 is an example of a block diagram of a network node configured to perform the techniques presented herein.

FIG. 7 illustrates an example block diagram for a network/service node, e.g., a switch, router, gateway, etc., configured to perform the operations described herein for a network node. It should be understood that a virtual network node would be a software-emulated or virtualized version of what is shown in FIG. 7. The network node 400 comprises a plurality of ports 410(1)-410(m), a network Application Specific Integrated Circuit (ASIC) 415, a processor or central processing unit (CPU) 420 and memory 430. The ports 410(1)-410(m) receive ingress packets and output egress packets from the network node. The network node ASIC 420 directs incoming packets to ports for egress according to logic as well as controls from the processor 420. For example, if the network node is a router, then the ASIC 415 is a router ASIC configured for network routing functions, and if the network node is a switch, then the ASIC 415 is a switch ASIC configured for network switch functions. The processor 420 is a microprocessor or microcontroller, for example, and executes instructions for the service header processing firmware/software 440 stored in memory 430. The service header processing firmware/software 440 includes instructions that, when executed by the processor 420, cause the processor to perform the operations described herein in connection with FIGS. 1-6 for a network node/service node.

The operations of a service function associated with network node 400 are implemented by service function software 450 running on a processor core or server blade 460 that is in communication with a port, e.g., port 410(m), of the network node.

The memory 430 may comprise read only memory (ROM), random access memory (RAM), magnetic disk storage media devices, optical storage media devices, flash memory devices, electrical, optical, or other physical/tangible memory storage devices. In general, the memory 430 may comprise one or more tangible (non-transitory) computer readable storage media (e.g., a memory device) encoded with software comprising computer executable instructions and when the software is executed (by the processor 420) it is operable to perform the operations described herein.

Figure 8:
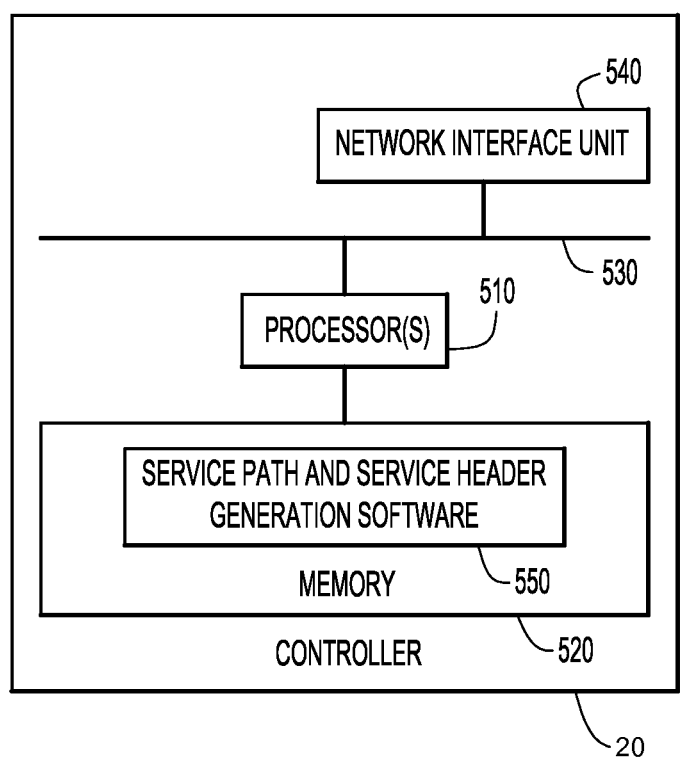
FIG. 8 is an example of a block diagram of a controller that communicates with a plurality of network nodes.

Turning now to FIG. 8, an example block diagram is shown for a controller configured to perform the operations described herein for controller 20. It should be understood that a virtual controller would be a software-emulated or virtualized version of what is shown in FIG. 8, such as software running in a data center. The controller 20 includes one or more processors 510, memory 520, a bus 530 and a network interface unit 540. The processor 510 may be a microprocessor or microcontroller. The network interface unit 540 facilitates network communications between the controller 20 and the network nodes. The processor 510 executes instructions associated with software stored in memory 520. Specifically, the processor 510 stores service path and service header generation software 550 that, when executed by the processor 510, causes the processor 510 to perform the operations for the controller described herein with respect to FIGS. 1-6.

The memory 520 may comprise read only memory (ROM), random access memory (RAM), magnetic disk storage media devices, optical storage media devices, flash memory devices, electrical, optical, or other physical/tangible memory storage devices. In general, the memory 520 may comprise one or more tangible (non-transitory) computer readable storage media (e.g., a memory device) encoded with software comprising computer executable instructions and when the software is executed (by the processor 510) it is operable to perform the operations described herein.

In summary, techniques are presented herein for carrying service related metadata within Network Service Headers that are independent of the underlying transport infrastructure. Service related metadata may be carried independently of the underlying transport, thereby reducing the amount of standardization necessary for each available transport technology. Network Service Headers may be added to encapsulated network packets or frames to create network service paths. Path information as well as metadata used by network devices and/or network services may be carried. A non-static structure on the context headers enables a central element in the network to define structure dynamically. A service function within a service chain may utilize the results of the execution of a prior service function within the chain as such information may be carried within the data plane.

Furthermore, the techniques presented herein provide the ability, not heretofore known, to (i) carry service-specific metadata, (ii) base forwarding decisions on metadata carried within a service header encapsulation, and (iii) extract context metadata for consumption by an external process (e.g., a service function).

Thus, the techniques presented herein may be embodied in a method, an apparatus and computer readable storage media, for example. In method form, the method involves, in a network comprising a plurality of network nodes each configured to apply one or more service functions to traffic that passes through the respective network nodes, receiving at a network node packets encapsulated in a service header that includes information defining a variable set of context headers stacked into an association of metadata that is relevant to one or more service functions within a service path comprised of one or more network nodes; and at the network node, interpreting a forwarding state and a next-hop network node for the service path from the service header, and determining a service action or associated metadata from the set of context headers.

In apparatus form, an apparatus is provided comprising a network interface unit configured to enable communications over a network, the network comprising a plurality of network nodes each configured to apply one or more service functions to traffic that passes through the respective network nodes; memory; and a processor coupled to the network interface unit and the memory, wherein the processor is configured to: receive packets encapsulated in a service header that includes information defining a variable set of context headers stacked into an association of metadata that is relevant to one or more service functions within a service path comprised of one or more network nodes; and interpret a forwarding state and a next-hop network node for the service path from the service header, and determine a service action or associated metadata from the set of context headers.

In computer readable storage media form, one or more computer readable storage media are provided encoded with software comprising computer executable instructions and when the software is executed operable to: receive, at a network node, packets encapsulated in a service header that includes information defining a variable set of context headers stacked into an association of metadata that is relevant to one or more service functions within a service path comprised of one or more network nodes; and interpret a forwarding state and a next-hop network node for the service path from the service header, and determine a service action or associated metadata from the set of context headers.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   in a network comprising a plurality of network nodes each configured to apply one or more service functions to traffic that passes through the respective network nodes, receiving at a network node packets encapsulated in a service header that includes a first set of context headers with metadata that is relevant to one or more service functions within a service path comprised of one or more network nodes;
   at the network node, performing at least one of the service functions in the service path; and
   rewriting the service header with a second set of context headers including metadata derived from performing the at least one service function at the network node.

2. The method of claim 1, further comprising determining how to forward traffic at the network node based solely on the service header or the second set of context headers in the service header.

3. The method of claim 2, wherein determining how to forward traffic at the network node comprises determining whether to bypass a service function at the network node based on the first set of context headers contained in the service header.

4. The method of claim 1, wherein a length of each context header is variable.

5. The method of claim 1, wherein each context header carries service related information of a different scope that is relevant to one or more service functions in the service path.

6. The method of claim 1, wherein the service header includes a base context header that specifies a service path identifier for the service path, and a length value corresponding to the number of context headers contained in the service header, a context length field for each context, and a context field containing the metadata for the corresponding context header.

7. The method of claim 1, further comprising at the network node, interpreting each context header in the first set of context headers and deriving a service profile used for performing the at least one service function at the network node in the service path.

8. The method of claim 1, further comprising, at the network node, transforming network traffic in accordance with metadata for a particular context header in order to support a particular service function.

9. The method of claim 1, further comprising, at a controller that is in communication with the plurality of network nodes, generating the service header that includes the first set of context headers.

10. The method of claim 1, further comprising the plurality of network nodes storing information, a priori, indicating the structure and definitions on which the second set of context headers are based.

11. An apparatus comprising:
a network interface unit configured to enable communications over a network, the network comprising a plurality of network nodes each configured to apply one or more service functions to traffic that passes through the respective network nodes;
a memory; and
a processor coupled to the network interface unit and the memory, wherein the processor is configured to:
receive packets encapsulated in a service header that includes a first set of context headers with metadata that is relevant to one or more service functions within a service path comprised of one or more network nodes;
perform at least one of the service functions in the service path; and
rewrite the service header with a second set of context headers including metadata derived from performing the at least one service function.

12. The apparatus of claim 11, wherein the processor is configured to determine how to forward traffic at the network node based solely on the service header or the second set of context headers in the service header.

13. The apparatus of claim 12, wherein the processor is configured to determine whether to bypass a service function at the network node based on the first set of context headers contained in the service header.

14. The apparatus of claim 11, wherein each context header carries service related information of a different scope that is relevant to one or more service functions in the service path.

15. The apparatus of claim 11, wherein the processor is configured to interpret each context header in the first set of context headers and derive a service profile used for performing the at least one service function at the network node in the service path.

16. One or more non-transitory computer readable storage media encoded with software comprising computer executable instructions and when the software is executed operable to:
receive, at a network node, packets encapsulated in a service header that includes a first set of context headers with metadata that is relevant to one or more service functions within a service path comprised of one or more network nodes;
perform at least one of the service functions in the service path; and
rewrite the service header with a second set of context headers including metadata derived from performing the at least one service function.

17. The computer readable storage media of claim 16, further comprising instructions operable to determine how to forward traffic at the network node based solely on the service header or the second set of context headers in the service header.

18. The computer readable storage media of claim 17, further comprising instructions operable to determine whether to bypass a service function at the network node based on the first set of context headers contained in the service header.

19. The computer readable storage media of claim 16, further comprising instructions operable to interpret each context header in the first set of context headers and derive a service profile used for performing the at least one service function at the network node in the service path.

20. The computer readable storage media of claim 16, wherein the service header includes a base context header that specifies a service path identifier for the service path, a length value corresponding to the number of context headers contained in the service header, a context length field for each context, and a context field containing the metadata for the corresponding context header.

* * * * *